United States Patent [19]

Reed

[11] Patent Number: 4,533,917
[45] Date of Patent: Aug. 6, 1985

[54] MULTIPLE FREQUENCY SIDE LOBE INTERFERENCE REJECTOR

[76] Inventor: John C. Reed, 439 Nevin St., Lancaster, Pa. 17603

[21] Appl. No.: 593,151

[22] Filed: Mar. 26, 1984

[51] Int. Cl.³ .......................... G01S 3/16; G01S 3/28
[52] U.S. Cl. ................................................. 343/379
[58] Field of Search ........................ 343/379, 378, 417

[56] References Cited

U.S. PATENT DOCUMENTS

| | | |
|---|---|---|
| 2,929,047 | 3/1960 | Rabin . |
| 3,341,846 | 9/1967 | McMurren et al. . |
| 3,431,405 | 3/1969 | Dawson . |
| 3,510,870 | 3/1969 | Woollvin . |
| 3,532,867 | 4/1970 | Ricketts, Jr. et al. . |
| 3,701,153 | 10/1972 | Gagliardi et al. . |
| 4,119,964 | 10/1978 | Johannsen et al. .............. 343/17.7 |
| 4,204,165 | 5/1980 | Ready . |

Primary Examiner—Theodore M. Blum
Attorney, Agent, or Firm—Eugene A. Parsons

[57] ABSTRACT

A transceiver, such as a radar transponder, for receiving signals, converting the frequency of the input signals to a digital address and storing a signal representative of the amplitude of the input signal in a bin determined by the address. If the current amplitude exceeds a predetermined relationship with the stored amplitude a response is transmitted and if the current amplitude exceeds the stored amplitude the current amplitude is stored.

12 Claims, 1 Drawing Figure

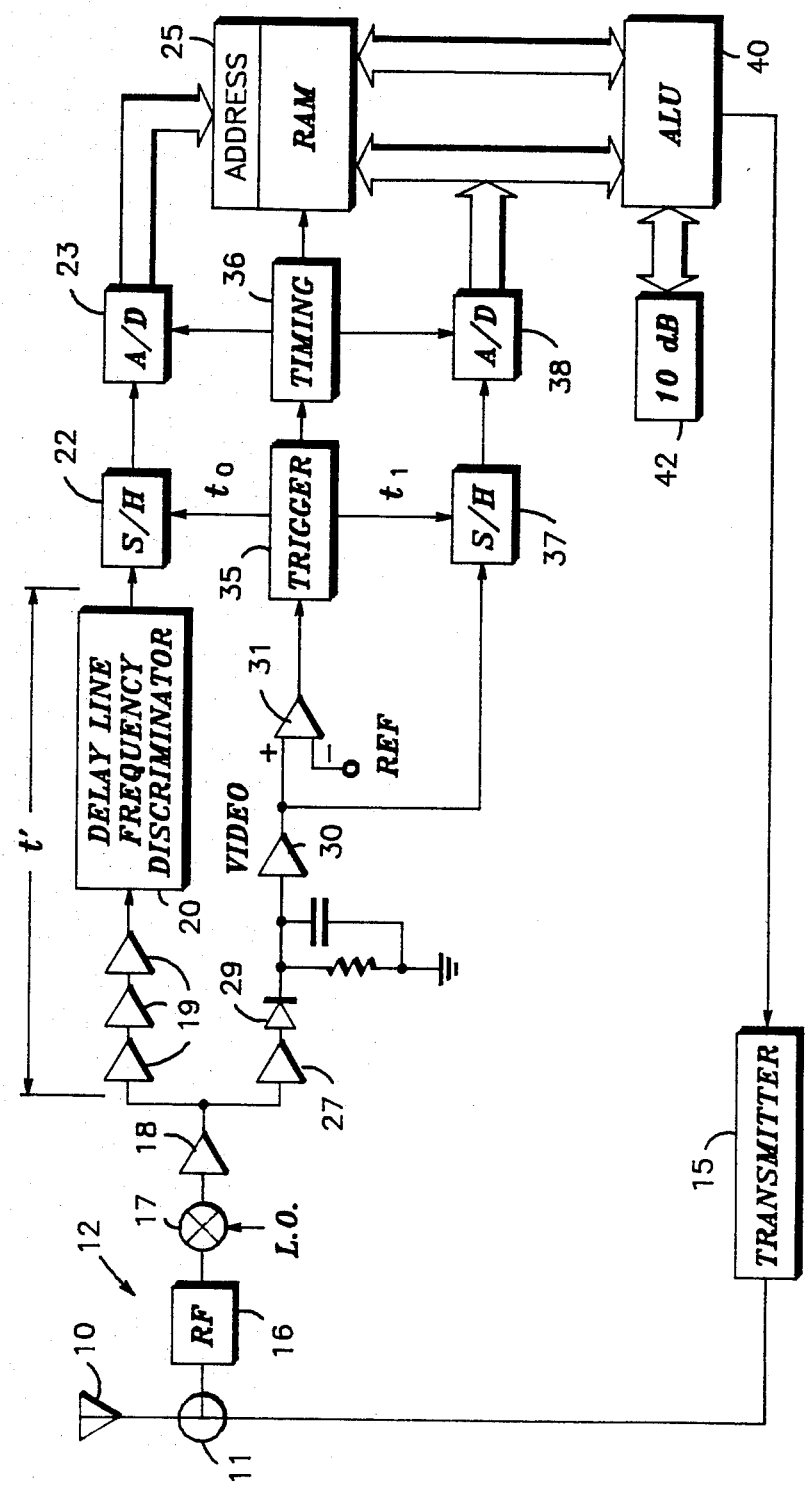

MULTIPLE FREQUENCY SIDE LOBE INTERFERENCE REJECTOR

BACKGROUND OF THE INVENTION

Radar transponders, repeaters, and the like are constructed to transmit a reply in response to a received signal but should not reply to interference, extraneous signals, man-made interference and the like. In general, prior art structures do not distinguish between input frequencies but simply disable the receiver upon the reception of a strong side lobe signal. Thus, a strong side lobe signal at one frequency will disable the receiver for weak main lobe signals at a different frequency, even when the weak signal frequency is within the receiver input bandwidth.

SUMMARY OF THE INVENTION

The present invention pertains to a multiple frequency side lobe interference rejector wherein the frequency of a received signal is used as an address in a memory and the amplitude of the signal is compared to the amplitude stored at that address. If the amplitude of the current signal exceeds a predetermined relationship relative to the stored amplitude, a response is transmitted. If the amplitude of the current signal exceeds the amplitude of the stored signal the amplitude of the current signal replaces the stored amplitude.

It is an object of the present invention to provide a new and improved multiple frequency side lobe interference rejector.

It is a further object of the present invention to provide a transponder or the like which is capable of differentiating between various received signals and responding only to desired signals.

It is a further object of the present invention to provide a unit which will store a unique dynamic threshold word for each possible input frequency, allowing the receiver to process many signals at different frequencies according to their power level history regardless of power level differences between frequencies.

These and other objects of this invention will become apparent to those skilled in the art upon consideration of the accompanying specification, claims and drawing.

BRIEF DESCRIPTION OF THE DRAWING

The single FIGURE is a simplified block diagram of a radar transponder incorporating a multiple frequency side lobe interference rejector embodying the present invention.

DESCRIPTION OF THE PREFERRED EMBODIMENT

Referring to the FIGURE, the numeral ten designates an antenna utilized for transmission and reception. A typical coupler or RF switch 11 connects the antenna 10 to a receiver, generally designated 12, during reception and to a transmitter 15 during transmission. The receiver 12 includes an RF section 16, a mixer 17 having a local oscillator signal applied thereto and an IF amplifier 18. The receiver 12 and transmitter 15 may comprise a radar transponder, a communications repeater, etc.

Output signals from the IF amplifier 18 are supplied through a series of amplifiers 19 to a device for converting the signal to a varying DC, which in this embodiment is a delay line frequency discriminator 20. Since the described unit may be receiving a plurality of input signals at various frequencies and very close in time, the frequency discriminator 20 should be a fast response device. A sample and hold circuit 22 is connected to the output of frequency discriminator 20 and has an output connected to an analog to digital converter 23. The sample and hold circuit 22 is utilized to insure that each new signal from the frequency discriminator 20 is held long enough to allow the circuit 23 to develop a digital signal representative thereof. The digital signal from the A to D converter 23 is applied by way of a parallel bus to an address input of an addressable random access memory (RAM) 25. The RAM 25 is divided into a plurality of storage areas with each storage area representing a different bin of frequencies.

Output signals from the IF amplifier 18 are also supplied through an amplifier 27 to a detector circuit 29, which removes the carrier and supplies the envelope of the signal to a video amplifier 30. It will of course be understood that the term "video" is a term utlized in radar and the video amplifier 30 may be present in a radar transponder but other types of similar circuitry might be utilized in repeaters, etc. The output signal from the video amplifier 30 is applied to the positive terminal of a comparator 31, the negative terminal of which has a reference signal applied thereto. If the signal from the video amplifier 30 does not exceed the reference signal applied to the negative terminal of comparator 31 no signal appears at the output of comparator 31. Thus, the present circuitry ignores received signals which are not at least at a predetermined amplitude. If the signal from the video amplifier 30 exceeds the reference signal, comparator 31 supplies a signal to a trigger circuit 35. Trigger circuit 35 supplies trigger signals to sample and hold circuit 22, a timing circuit 36 and a second sample and hold circuit 37. The video signal from video amplifier 30 is also supplied to the sample and hold circuit 37 so that the amplitude of the video signal is sampled and held when the trigger 35 supplies a trigger to circuit 37. The triggers supplied to sample and hold circuits 22 and 37 are timed so that the delay in amplifiers 19 and frequency discriminator 20 are taken into account, to insure that the same input signal or pulse is being sampled and held in both circuits 22 and 37 at the correct times.

The output signal from sample and hold circuit 37 is converted to a digital signal by an analog to digital circuit 38 and the digital representation of the amplitude of the received signal is supplied on a parallel bus to an arithmetic logic unit 40. The arithmetic logic unit 40 is connected by parallel buses to RAM 25 and to a 10 dB word generator 42. The arithmetic logic unit 40 supplies a transmit signal to transmitter 15 when predetermined conditions are met, as described below.

In the operation of the disclosed interference rejector, when a radar interrogation pulse is received, the carrier frequency of the pulse is converted to a digital word and the word is used to address a specific bin in RAM 25. In this manner each frequency in the input bandwidth of receiver 12 is assigned a unique bin or register. Simultaneously, the amplitude of the received pulse is converted to a digital word and compared to the amplitude of any word already stored in the addressed bin. If the amplitude of the current word exceeds the amplitude of the stored word, the new amplitude is stored in the addressed bin of RAM 25. Also, if the current amplitude exceeds the stored amplitude minus 10 dB, the arithmetic logic unit 40 instructs transmitter 15 to respond to the received pulse. If the current amplitude from converter 38 does not exceed the stored amplitude minus 10 dB the arithmetic logic unit 40 does not instruct transmitter 15 to respond. While the present embodiment utilizes a 10 dB threshold it will be understood by those skilled in the art that any convenient relationship to the stored amplitude might be utilized.

Thus, a multiple frequency side lobe interference rejector is disclosed which instantaneously measures and digitizes carrier frequency and peak power of a received input pulse. The digitized frequency word is used to address a register in a random access memory and, thus, assigns a unique bin or register to each frequency in the receiver input bandwidth. The rejector determines input frequency on a signal-by-signal, or pulse-by-pulse, basis, compares the current level word to a stored level word and reacts accordingly to the comparison. The unit stores a unique dynamic threshold word for each possible input frequency, allowing the receiver to process many signals at different frequencies according to their power level history regardless of power level differences between frequencies. Because of the unique processing technique for each input signal, the interference rejector does not require absolute frequency measurement or integration techniques and is therefore very simple and efficient.

The device has been illustrated as a radar transponder and as incorporating digital circuitry, but it will be understood by those skilled in the art that other applications and other circuitry might be utilized to achieve the described results. Thus, while I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. A multiple frequency side-lobe interference rejector comprising:
    a receiver for receiving transmitted signals within a predetermined band of frequencies and providing output signals representative thereof;
    first means coupled to said receiver for receiving the output signals therefrom and providing signals representative of the frequency thereof;
    second means coupled to said receiver for receiving the output signals therefrom and providing signals representative of the amplitude thereof;
    memory means having a plurality of storage areas, one for each of a plurality of bins of frequencies in the band, and a storage area selection input; and
    means connecting the signals provided by said first means to the storage area selection input of said memory means and connecting the signals provided by said second means to said memory means for storage in the selected area.

2. A multiple frequency side-lobe interference rejector as claimed in claim 1 wherein the first means includes an analog to digital converter for converting the frequency of the receiver output signal to a digital address.

3. A multiple frequency side-lobe interference rejector as claimed in claim 2 wherein the first means further includes means for converting the output signal of the receiver to a variable DC signal and a sample and hold circuit connected thereto and to the analog to digital converter.

4. A multiple frequency side-lobe interference rejector as claimed in claim 3 wherein the converting means includes a frequency discriminator.

5. A multiple frequency side-lobe interference rejector as claimed in claim 1 wherein the second means includes an analog to digital converter for converting the amplitude of the output signal of the receiver to a digital word.

6. A multiple frequency side-lobe interference rejector as claimed in claim 5 wherein the second means includes means for converting the output signal of the receiver to a variable DC signal and a sample and hold circuit connected thereto and to the analog to digital converter.

7. A multiple frequency side-lobe interference rejector as claimed in claim 1 including in addition comparison means connected to the memory means and the second means for comparing a current amplitude to a stored amplitude.

8. A multiple frequency side-lobe interference rejector as claimed in claim 7 wherein the comparison means includes an arithmetic logic unit.

9. A multiple frequency side-lobe interference rejector as claimed in claim 7 including in addition a transmitter coupled to the comparison means for transmitting a response to received signals whenever the amplitude exceeds a predetermined relationship to the stored amplitude.

10. A method of rejecting multiple frequency side-lobe interference comprising the steps of:
    receiving transmitted signals within a predetermined band of frequencies;
    providing a signal representative of the frequency of each of the received signals;
    providing a signal representative of the amplitude of each of the received signals;
    providing a memory having a plurality of addressable bins;
    addressing predetermined bins of the memory with the signals representative of the frequency; and
    storing the signals representative of the amplitude in the addressed bins.

11. A method as claimed in claim 10 wherein the storing step includes the step of comparing a current amplitude to a stored amplitude and storing the greater of the two.

12. A method as claimed in claim 11 including in addition the step of transmitting a response to the received signal whenever the signal representative of the amplitude exceeds a predetermined relationship to the stored amplitude.

* * * * *